United States Patent
Aizawa

[11] 3,945,282
[45] Mar. 23, 1976

[54] MATERIAL INDEXING FEED MECHANISM FOR CUTTING MACHINES

[75] Inventor: Tsuneo Aizawa, Isehara, Japan

[73] Assignee: Amada Company, Ltd., Isehara, Japan

[22] Filed: June 19, 1974

[21] Appl. No.: 480,728

[30] Foreign Application Priority Data
June 19, 1973 Japan.............................. 48-71809

[52] U.S. Cl. ..................... 83/247; 83/277; 83/522; 214/1.4
[51] Int. Cl.² .......................................... B26D 7/06
[58] Field of Search ...... 83/247, 277, 522; 226/100, 226/141, 162; 214/1.4

[56] References Cited
UNITED STATES PATENTS

| | | | |
|---|---|---|---|
| 2,749,981 | 6/1956 | MacKinnon et al. | 83/247 X |
| 3,194,100 | 7/1965 | Fehlberg | 83/247 |
| 3,212,380 | 10/1965 | Gobel et al. | 83/247 |
| 3,293,971 | 12/1966 | Kuss | 83/522 X |
| 3,504,585 | 4/1970 | Harris | 83/247 X |
| 3,523,632 | 8/1970 | Shields | 226/162 |
| 3,602,348 | 8/1971 | Mohr | 83/277 X |

Primary Examiner—J. M. Meister
Attorney, Agent, or Firm—Wigman & Cohen

[57] ABSTRACT

This disclosure relates to an indexing feed mechanism for a cutting machine comprising an indexing vise for gripping a workpiece and moving it forward into a cutting position. The mechanism includes a lead screw interengaged with complementary means formed on a stopper means adapted to limit the rearward extent of the stroke of the indexing vise. Rotation of said screw will, therefore, cause translation of said stopper means thereby varying the rearward limit of travel of the indexing vise during its stroke. The lead screw extends from a rotatable shaft and means located at the operating station of the cutting machine are provided for rotating the shaft. The shaft is operably connected to a digital indicator which indicates in digital numerals the predetermined stroke of the indexing vise as a function of the angular position of the shaft.

7 Claims, 2 Drawing Figures

MATERIAL INDEXING FEED MECHANISM FOR CUTTING MACHINES

BACKGROUND OF THE INVENTION

1. Field of the Invention

The present invention relates to indexing feed mechanisms which are used for cutting machines such as horizontal bandsaw machines to indexing feed or index materials to be cut into the cutting position thereof to automatically cut lengths of materials into pieces of predetermined uniform length.

2. Description of the Prior Art

In cutting machines such as horizontal bandsaw machines, the indexing feed mechanism has been so constructed that a vise usually called a stationary vise and fixedly mounted just behind the cutting plane of the cutting tool grips and holds the material to be cut during the cutting operation and another vise usually referred to as an indexing vise and movably mounted behind the stationary vise is reciprocated to feed or index the material to be cut into the cutting zone through the stationary vise. The length of the pieces cut from the material is determined by the distance the material is pushed out beyond the cutting plane by the indexing vise. Accordingly, in order to cut the material into pieces of a desired length, the stroke or distance the indexing vise advances with the material held thereby must be adjusted. Usually, suitable stopper means provided with limit switches are employed to limit the stroke of the indexing vise, and usually the stopper means for defining the limit of the forward or feeding travel of the indexing vise is fixed and the stopper means for limiting the rearward travel of the same is adjustably mounted for the adjustment of the stroke of the indexing vise.

Heretofore, in order to adjust the position of the stopper means for the rearward limit of the indexing vise, an elongated scale means has been provided in parallel with the travel way of the indexing vise which is located behind and apart from the front of the machine where the machine is designed to be operated, and the adjustment of the stopper means has been done by setting a pointer to the scale.

Accordingly, when operating the machine provided with the conventional indexing means, the operator has to go to the back of the machine away from his operating position each time when it is desired to change or determine the length of the pieces cut from the material. Also, it is very troublesome to adjust the pointer to the fine graduation of the scale.

SUMMARY OF THE INVENTION

It is a primary object of the present invention to provide a material indexing feed mechanism for cutting machines such as horizontal bandsaw machines which can be most easily operated.

More particularly, it is an object of the present invention to provide a material indexing feed mechanism in which the indexing amount or the length of the pieces cut from the material can be easily changed or determined from the operating position of the machine provided therewith without going to the back of the machine.

It is another object of the present invention to provide a material indexing feed mechanism in which the indexing amount or the length of the pieces to be cut from the material is indicated by digital numerals through a digital indicator that is easy to see.

Other and further objects and advantages of the present invention will be apparent from the following description and accompanying drawings which, by way of illustration, show a preferred embodiment of the present invention and the principle thereof.

DESCRIPTION OF THE PREFERRED EMBODIMENT

Figure 1:
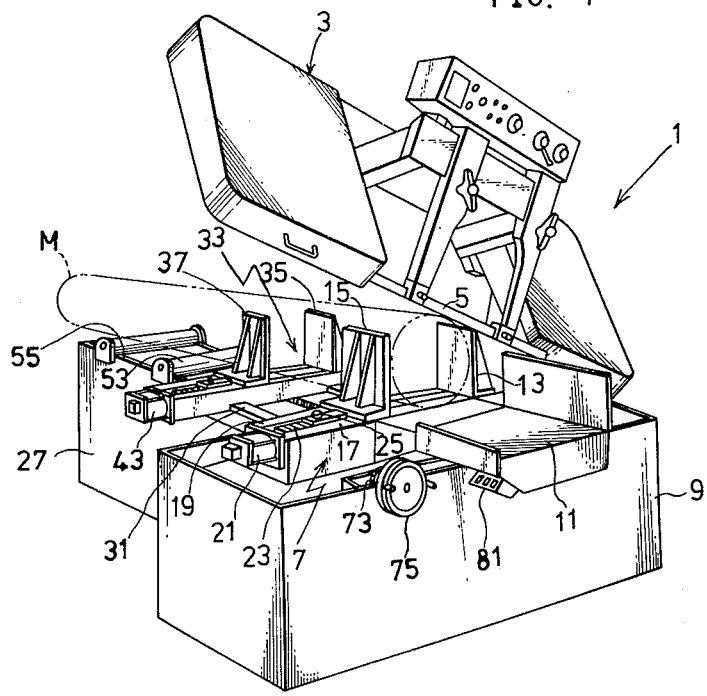
FIG. 1 is a perspective view of a horizontal bandsaw machine embodying the principles of the present invention.

Only for the purpose of clear description, the indexing feed mechanism according to the present invention will be described as applied to a horizontal bandsaw machine. However, it will be understood that the invention is not limited in application to horizontal bandsaw machines but it is applicable to any types of cutting machines such as hacksawing machines and circular sawing machines, etc.

Referring to the Figures, a horizontal bandsaw machine generally designated by the numeral 1 is so constructed that a cutting head 3 enclosing therein two wheels (not shown) over which an endless bandsaw blade 5 is trained as a cutting tool is lowered during the cutting operation so that the bandsaw blade 5 may cut into a material M to be cut which has been gripped by a vise 7 mounted on an elongated base 9. Since in operating the horizontal bandsaw machine the bandsaw blade 5 and the material M to be cut have to be watched, the horizontal bandsaw machine 1 is so designed as to be operated at the position in the vicinity of the bandsaw blade 5, and the portion of the machine where the bandsaw blade 5 is to operate is usually regarded as the front. Also, in the horizontal bandsaw machine 1, the material M to be cut is fed from the rear side of the vise 7 to the front side of the same, and therefore a so-called front work table 11 is provided in front of the vise 7 to receive pieces cut from the horizontal material M.

Thus, the bandsaw machine is similar in many respects to other cutting machines such as hacksawing machines and circular sawing machines and differs from them in that the cutting tool is an endless band and is trained over the wheels.

As is conventional, the vise 7, which will be hereinafter called stationary vise from another vise, is fixedly mounted on the base 9 and comprises a fixed vise jaw 13 and a movable vise jaw 15. As implied by the names, the fixed vise jaw 13 is fixedly provided and the movable vise jaw 15 is movably mounted on two guide plates 17 and 19 so as to be reciprocated by a hydraulic cylinder 21 through a piston and piston rod enclosed therein towards and away from the fixed jaw 13 to hold and releast the material M to be cut. Also, in order to make the stroke of the piston and piston rod of the hydraulic cylinder 21 shorter, the movable vise jaw 15 is connected with the hydraulic cylinder 21 by means of a rack 23 and a pawl 25, by which the stroke of the movable vise jaw 15 is adjusted.

As shown in the Figures, an elongated rear base 27 is integrally combined with the back of the front base 9 in a manner such that it is perpendicular to the front base 9, and also two rails 29 and 31 are disposed on the top of the rear base 27 in parallel with each other and at right angles to the cutting plane where the bandsaw blade 5 operates.

Another vise 33 called indexing vise is slidably mounted on the rails 29 and 31 on the rear base 27. This indexing vise 33 is quite identical to the stationary vise 7 in that it comprises a fixed vise jaw 35, a movable vise jaw 37, guide plates 39 and 41, a hydraulic cylinder 43, a rack 45 and a pawl 47. However, the indexing vise 33 is so designed as to be reciprocated on the rails 29 and 31 towards and away from the front stationary vise 7 by a piston and piston rod 49 of a double-acting hydraulic cylinder 51 mounted on a rear end portion of the rear base 27.

Thus, the arrangement is such that the indexing fixe 33 grips the elongated material M to be cut and advances it into the stationary vise 7 which has been previously opened and then the stationary vise 7 grips the material M to hold it during the cutting operation and indexing vise 33 is returned preparatory to the next feeding stroke. Also, in order to support the rear portion of the material M to be cut, freely rotatable rollers 53 and 55 are provided at the rear end portion of the rear base 27 and above the hydraulic cylinder 51.

To those skilled in the art, it will now be apparent that the length of the pieces cut from the material M is determined by the distance the material M to be cut is pushed out beyond the cutting plane of the bandsaw blade 5 by the indexing vise 33 and it is also determined by the stroke of the indexing vise 33 that is the distance the indexing vise 33 travels with the material M in its hold.

Figure 2:
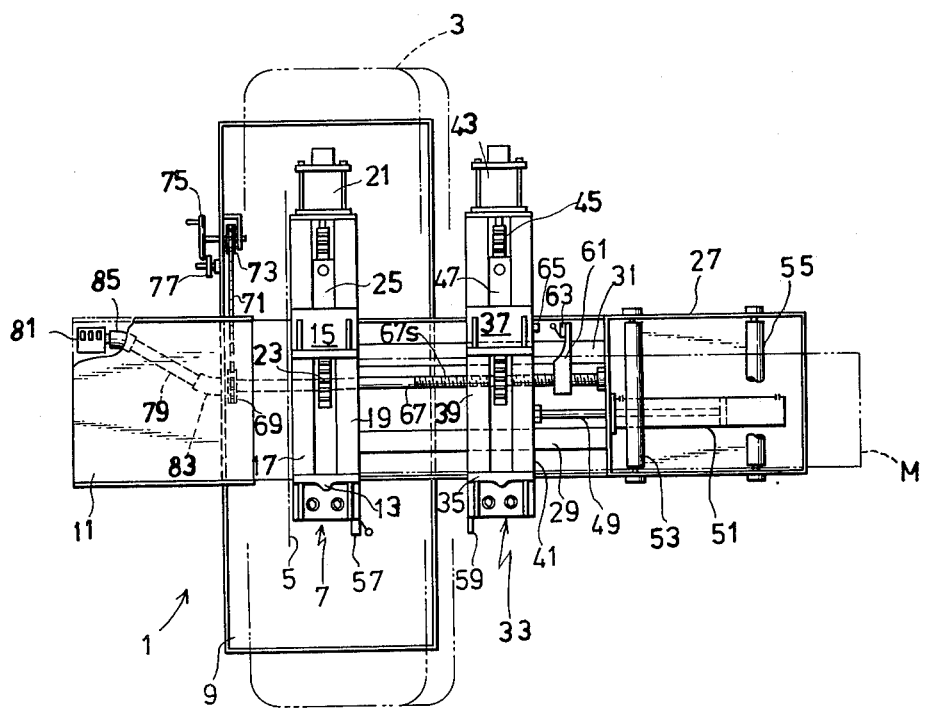
FIG. 2 is a plan view of the horizontal bandsaw machine shown in FIG. 1, with upper portions thereof being omitted for clarity.

As shown in FIG. 2, in order to define the limit of the forward or feeding travel of the indexing vise 33, there is provided on a portion of the stationary vise 7 a limit switch 57 which is so designed as to work to stop the extension of the piston and piston rod 49 when touched by a projection 59 provided on a portion of the indexing vise 33. Also, on bringing the projection 59 provided thereon into contact with the limit switch 57, the indexing vise 33 is firmly stopped by the inner or rear end face of the stationary vise 7 from further advancing forwards. Thus, the forward limit of the stroke or travel of the indexing vise 33 is always fixed.

On the other hand, the rearward limit of the stroke of the indexing vise 33 is variably defined by a movable stopper member 61 which is provided with a limit switch 63 which is designed to stop the retraction of the piston and piston rod 49 when touched by a projection 65 provided on a portion of the indexing vise 33.

The stopper member 61 is so constructed as to be moved on the top of the rear base 27 along the rail 31 in either direction by a lead screw 67s formed on an elongated shaft 67 which is rotatably provided beneath the stationary vise 7 and the indexing vise 33 and in parallel with the rails 29 and 31 and extends outward to the front of the stationary vise 7.

In order to rotate the lead screw 67s to move the stopper member 61 in either direction, the shaft 67 is provided at its outer end with a sprocket 69 which is connected through a chain 71 with another sprocket 73 which is in turn coaxial with a handwheel 75. Accordingly, the lead screw 67s can be rotated in either direction by turning the handwheel 75 to move the stopper member 61 in either direction in order to change or adjust the stroke of the indexing vise 33. Also, for the purpose of locking the handwheel 75, there is provided in the vicinity of the handwheel 75 a locking member 77 which is shown in the Figures as a member rotatable on a threaded projection.

On the other hand, in order to make it easy to set the stroke of the indexing vise 33, the lead screw shaft 67 is connected through a connecting shaft 79 with a digital indicator 81 which has been so designed as to indicate in digital numerals the stroke of the indexing vise 33 according to the rotation of the lead screw shaft 67. In the preferred embodiment, the digital indicator 81 is mounted on the underside of the front work table 11 and it is connected by the connecting shaft 79 with the outermost end of the lead screw shaft 67 by means of universal joints 83 and 85. However, the digital indicator 81 can be located most visibly at any portion of the machine, and, if desired, the digital indicator 81 can be connected by the connecting shaft 79 with the lead screw shaft 67 at right angles thereto by means of any suitable means such as bevel gears in place of the universal joints 83 and 85.

Thus, it will now be understood that the stroke of the indexing vise 33 can be easily changed or determined by rotating the handwheel 75 and its amount can be most easily and visibly seen from the digital indicator 81.

Stated more particularly, when the handwheel 75 is manually turned, it turns the lead screw shaft 67 through the sprocket 73, the chain 71 and the sprocket 69, and accordingly the lead screw shaft 67 will on the one hand work the digital indicator 81 for the desired length of the pieces cut from the material M and on the other hand it will make the lead screw 67s move the stopper member 61 to the position corresponding to the desired length. When positioned where the digital indicator 81 gives digital numerals of the desired length, the stopper member 61 will define the stroke of the indexing vise 33 so that the same may index the desired length of the material M to be cut, since the digital indicator 81 has been so programmed as to indicate always length of the pieces cut from the material M. Also, it will be readily understood that the stroke of the indexing vise 33 is always determined only by the position of the stopper member 61 which defines the rearward limit of the travel of the indexing vise 33, since the limit switch 57 defining the forward limit of the same is always fixed.

Accordingly, when it is desired to change or determine the length of the pieces cut from the material M, it is only necessary for the operator to turn the handwheel 75 in either direction with his eyes upon the digital indicator 81 at his operating position until the digital indicator 81 gives numerals of the desired length of the pieces to be cut.

As has been described, the material indexing feed mechanism according to the present invention is so designed that the length of pieces to be cut from the material M or the stroke of the indexing vise 33 can be easily changed or determined at the operating position of the machine equipped therewith by means of the visible indicator 81 without goind to the back of the machine.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. A material indexing feed mechanism for a cutting machine such as a horizontal bandsaw machine or the like comprising an indexing vise for gripping a workpiece and moving it forward toward an operating station of said machine into a cutting position, means defining a path of travel for said indexing vise, means for moving said indexing vise back and forth along said path, stopper means for limiting the rearward extent of said indexing vise along said path in a direction away from said cutting position, means carried by said stopper means operatively connected with said moving means for stopping the operation of said moving means upon engagement therewith by means carred by said vise, a lead screw interengaged with complimentary means on said stopper means and extending parallel to said path for adjusting the position of said stopper means, said lead screw being connected to a rotatable shaft which extends to said operating station of said machine, and means located at said operating station for rotating said shaft, whereby rotation of said lead screw through said shaft will cause translation of said stopper means along said path thereby varying the rearward limit of travel of said indexing vise.

2. A material indexing feed mechanism as defined in claim 1, wherein said shaft is operably connected to digital indicator means for indicating in digital numerals the predetermined stroke of said indexing vise as a function of the angular position of said shaft.

3. A material indexing feed mechanism as defined in claim 1, wherein said means carried by said stopper means is a limit switch, and said means carried by said vise is a projection extending therefrom adapted to activate said limit switch.

4. A material indexing feed mechanism as defined in claim 3, wherein said moving means includes an hydraulic cylinder having piston rod means connected to said vise, said piston rod means being retractable into said cylinder during the rearward movement of said vise away from said operating station, and wherein the retraction of said piston rod means is stopped upon activation of said limit switch.

5. Apparatus for cutting material in incremental lengths comprising a feed table, cutting means mounted at a cutting position and movable in a plane extending generally transverse to said table, a first vise fixed with respect to said table for holding the material in position to be cut, a second vise movable with respect to said table for indexing the material in incremental lengths along a path to said cutting position, means for moving said movable vise back and forth along said path, stop means for limiting the rearward extent of said movable vise along said path in a direction extending away from said cutting station, means for adjusting the position of said stop means along said path thereby varying the length of the indexing increment, said adjusting means including operating means disposed on the opposite side of said cutting plane from said first and second vises.

6. Apparatus as defined in claim 5, wherein said adjusting means includes a lead screw interengaged with complimentary means on said stop means and extending parallel to said path, said lead screw being formed on a rotatable shaft which extends to said cutting position, and wherein said operating means includes means for rotating said rotatable shaft.

7. Apparatus as defined in claim 6, further including digital indicator means readable from said cutting position and operably connected to said shaft for indicating in digital numerals the length of said indexing increment as a function of the angular position of said shaft.

* * * * *